April 25, 1961 G. E. LONG 2,981,000
SURVEYOR STAKE
Filed Aug. 22, 1957
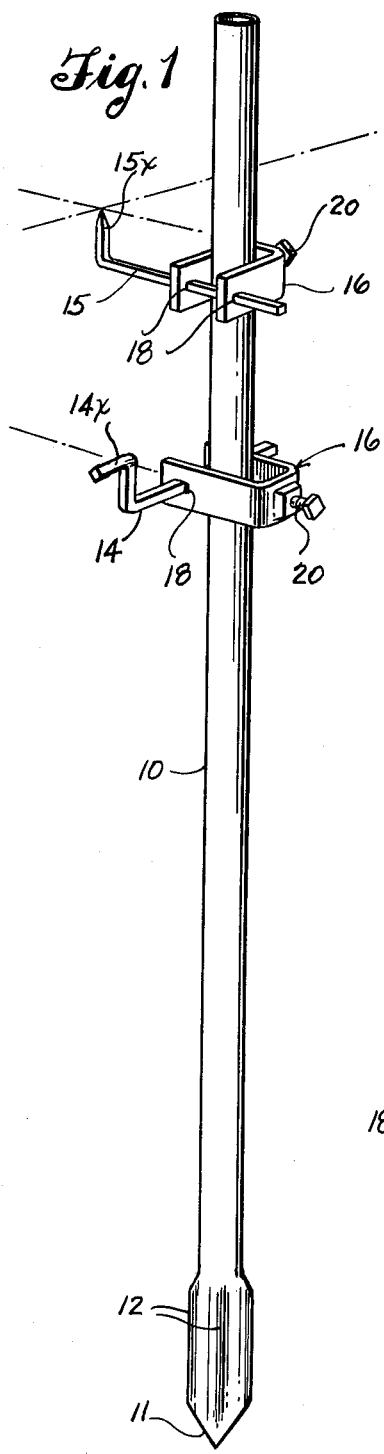
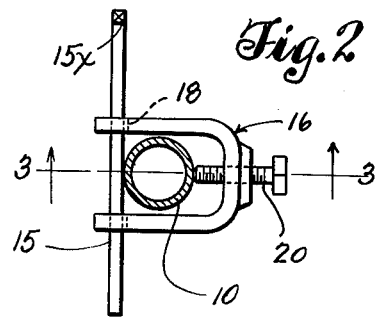
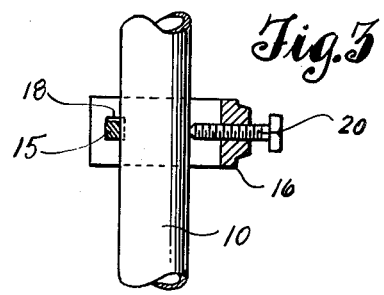
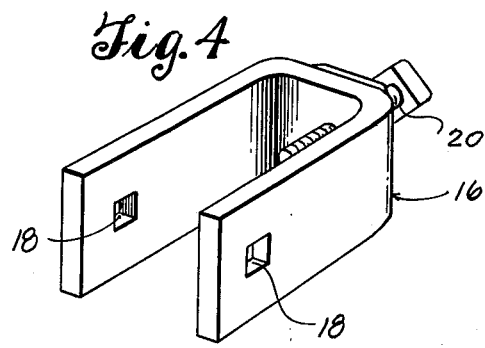
INVENTOR.
GEORGE E. LONG
BY
Robinson & Berry
ATTORNEYS

2,981,000
SURVEYOR STAKE

George E. Long, 16041 33rd NE., Seattle, Wash.

Filed Aug. 22, 1957, Ser. No. 679,595

4 Claims. (Cl. 33—1)

This invention relates to what are generally designated, in the art to which the invention pertains, as a "surveyor stake," but which in its present form and use is referred to as a "grade and line stake."

It is the principal object of this invention to provide a novel "grade and line" stakes embodying improvements whereby the establishing of an offset line showing grade, line and station can be accomplished in less time and at lesser expense than by use of stakes now generally employed.

More specifically stated, the present invention resides in the provision of a stake that can be easily driven and which is non-rotatable after being driven, and on which stake line and grade arms are rotatably and longitudinally adjustable and each is equipped with an easily releasable means for its securement at a set position.

Further objects and advantages of the invention reside in the details of construction of the various parts; in their assembled relationship and in their mode of use, as will hereinafter be fully described.

In accomplishing the above mentioned and other objects of the invention, I have provided the improved details of construction, the preferred forms of which are illustrated in the accompanying drawings, wherein—

Fig. 1 is a perspective view of a grade and line stake embodying the present improvements.

Fig. 2 is a cross-section of the stake showing the form of clamp employed for the securement of the grade and line arms.

Fig. 3 is a vertical section taken on line 3—3 in Fig. 2.

Fig. 4 is a perspective view of an arm mounting and securing clamp as used on the device.

Referring more in detail to the drawings—

10 designates, in its entirety, a round stake, here shown to be tubular but not necessarily so, and having a length that is suitable for its intended use. This stake, preferably of metal, is formed at its upper end with a flat surface which adapts it to be hammer driven, and it is formed with a point at its lower end, as at 11, to facilitate its being driven. Also, it is formed with a plurality of longitudinal fins 12 along its lower end portion to guide it when being driven and to hold it against rotation after being driven into the earth.

Mounted on the upper end portion of the stake, are what are designated as the "grade arm" 14 and the line arm 15; each arm being mounted and adjustably secured to the stake by a clamp 16. These clamps are alike, each comprising U-shaped body adapted to receive the stake between its spaced opposite leg portions. Near their outer ends, the leg portions have holes 18 formed therethrough, in alignment, and the inner end portion of the corresponding arm, 14 or 15, is applied through the aligned holes.

A clamping bolt 20 is threaded through the base portion of each clamp in a direction parallel with the leg portions to engage at its inner end with the stake to which the clamp is applied. This bolt is inwardly adjustable against one side of the stake to draw the clamp mounted arm, 14 or 15, against the opposite side thus to hold both the clamp and arm in their positions of adjustment.

The arms 14 and 15 preferably are made from short lengths of metal bar of square cross-section to prevent their rotation in the clamps. The line arm 15 is formed at its outer end with an upturned point 15x and the grade arm 14 has an upwardly offset outer end portion 14x that extends parallel to the main body portion. Both arms are longitudinally adjustable in their mounting clamps and the clamps may be moved longitudinally along and rotated on the stake upon the loosening of the clamp bolts 20 and then secured by the tightening of the bolts.

Assuming the various parts to be so constructed and assembled, the stake is used as follows:

It is driven vertically into the sub-grade by hand or mechanical means near the specified location. The clamp screw 20 of the clamp 16 carrying the line arm 15 is then loosened and the parts so adjusted on the stake that the point 15x of the arm coincides with the location of line and station, then the clamp screw 20 is tightened to secure the adjustment. The grade indicating arm 14 is then adjusted on the stake in a similar manner, so that the grade will be indicated by the position of the upwardly offset portion 14x of the arm. Securement of the clamp and arm is then effected. When set, the position of the arms is generally as in Fig. 1.

Stakes of this character can be set, and the arms adjusted easily and faster than in use of stakes presently being used. They are satisfactory in use and relatively inexpensive.

Various advantages are gained by use of stakes of this character. For example: Errors in grade or line can be easily seen and corrected. The setting of the arm 15, which designates line and station, in a separate operation from setting the grade arm permits smaller crews to complete each, both faster and with greater accuracy.

Time is saved by eliminating the usual procedure of driving wood hubs exactly on line and station.

What I claim is:

1. A surveyor's stake comprising a straight rigid shaft adapted to be driven into the ground, a rigid line arm, first clamp means rotatably and slidably movable on said shaft for operatively securing said line arm in adjusted position on said shaft with the line arm extending substantially normally to said shaft, said line arm being mounted in said first clamp means for longitudinal adjustment relative to the clamp, said first clamp including means for locking the clamp and line arm in any desired vertical position along the shaft and any desired position of rotation around the longitudinal axis of the shaft, a rigid grade arm, second clamp means rotatably and slidably movable along said shaft for operatively securing said grade arm in adjusted position on said shaft with the grade arm extending substantially normally to said shaft, said second clamp including means for locking the clamp and grade arm in any desired vertical position along the shaft and any desired position of rotation around the longitudinal axis of the shaft, whereby the line arm may be adjusted to determine the point of line and station, and the grade arm may be independently adjusted to establish a grade line in reference to the line and station point without moving the line arm.

2. Apparatus as defined in claim 1, wherein the line arm includes a vertically disposed portion at one end thereof extending substantially normally from the remaining portion of the line arm.

3. Apparatus as defined in claim 1, wherein said grade arm has an end portion offset from and extending parallel with the remaining portion of the grade arm.

4. A surveyor's stake comprising a straight rigid shaft which has a substantially cylindrical outer surface, first and second clamp means each rotatably and slidably movable along said shaft, each of said clamp means comprising a substantially U-shaped body having a base portion and spaced leg portions, the leg portions of each of said bodies having holes formed therethrough in alignment near the outer ends thereof, a clamping bolt threaded through the base portion of each of said bodies and adapted to engage at its inner end the shaft with the shaft received between said leg portions, a rigid line arm slidably extending through the aligned openings in the leg portions of one of said bodies, said line arm engaging said shaft on the opposite side thereof and in diametric alignment with its associated clamping bolt such that the line arm extends substantially normally to said shaft, and whereby the line arm may be adjusted longitudinally with respect to the associated body and the associated body may be clamped in any desired vertical position along the shaft and any desired position of rotation around the longitudinal axis of the shaft by the associated clamping bolt, a rigid grade arm extending through the aligned openings in the leg portions of the other of said bodies, said grade arm engaging said shaft on the opposite side thereof and in diametric alignment with its associated clamping bolt such that the grade arm extends substantially normally to said shaft, and the grade arm along with its associated body may be clamped in any desired vertical position along the shaft or any desired position of rotation around the longitudinal axis of the shaft by the associated clamping bolt, and whereby the line arm may be adjusted to determine the point of line and station, and the grade arm may be independently adjusted to establish a grade line in reference to the line and station point without moving the line arm.

References Cited in the file of this patent

UNITED STATES PATENTS

| | | |
|---|---|---|
| 854,916 | Stoner | May 28, 1907 |
| 996,430 | Schrier | June 27, 1911 |
| 1,010,007 | Adams | Nov. 28, 1911 |
| 1,584,584 | Wood | May 11, 1926 |
| 2,621,409 | Dvorak | Dec. 16, 1952 |
| 2,780,869 | Long | Feb. 12, 1957 |